United States Patent [19]

Blackmore et al.

[11] 3,799,078

[45] Mar. 26, 1974

[54] METHOD FOR TRANSPLANTING PLANTS

[76] Inventors: Fred N. Blackmore; Fred N. Blackmore, Jr.; John R. Trachet, all of 2412 Yost Ave., Ann Arbor, Mich. 48104

[22] Filed: Apr. 19, 1972

[21] Appl. No.: 245,376

[52] U.S. Cl. .................. 111/2, 47/34.13, 221/211
[51] Int. Cl. ............................................ A01c 11/02
[58] Field of Search ............... 111/1-4, DIG. 1; 47/34.13, 37

[56] References Cited
UNITED STATES PATENTS

| 3,331,155 | 7/1967 | Chancellor | 47/37 |
| 2,592,052 | 4/1952 | McKenna | 111/1 X |
| 3,028,705 | 4/1962 | Howard | 47/34.13 |
| 3,446,164 | 5/1969 | Huang et al. | 111/3 |
| 3,517,629 | 6/1970 | Bridges et al. | 111/4 UX |

*Primary Examiner*—Robert E. Bagwill
*Attorney, Agent, or Firm*—Olsen and Stephenson

[57] ABSTRACT

Method for transplanting seedlings from a compartmented germinating tray to larger containers containing soil within which the plants can grow. The method provides for positioning a compartment of the germinating tray over the larger container, pushing the seedling and soil in the compartment of the tray out the bottom of the compartment and into the soil within the container, and then indexing the tray so that the operation can be repeated for a second container.

2 Claims, 11 Drawing Figures

3,799,078

METHOD FOR TRANSPLANTING PLANTS

BACKGROUND OF THE INVENTION

In growing greenhouse plants, such as flowers, seeds are planted in trays which are stacked in a germanating room in which the temperature and humidity are carefully controlled. After germination, transplantation of the seedlings from the small compartments of the germinating trays to larger growing cells on flats is necessitated by the limited area available within the germinating rooms. Prior methods required that transplantation be done manually, and manual transplanting represented a high cost item in the process of growing plants. This invention provides an improved method for transplanting and the apparatus necessary to implement the method.

SUMMARY OF THE INVENTION

The present invention provides an automated method for transplanting seedlings from the small compartments of a germinating tray to relatively larger growing cells. The method provides that the germinating compartment which contains the seedling in a small amount of soil is positioned above and adjacent the growing cell which also contains soil. In one embodiment the germinating compartment is rectangular and is constructed of resilient thermoplastic material which has an X-slit bottom wall. A plunger having a concave face pushes the seedling and soil together out of the compartment through the X-slit bottom and into the soil within the growing cell. The concave facing on the plunger serves to provide a protective cavity around the seedling during the transplant. Once the seedling is pressed into the soil of the growing cell, the plunger is retracted and the tray and the flat are moved so that the next germinating compartment with a seedling is aligned with the plunger and another growing cell.

Thus the present invention provides a method and apparatus for automatically planting seeds individually in compartments of a germinating tray and then transplanting the resulting seedlings to growing cells on a flat.

Further objects, features and advantages of this invention will become apparent from a consideration of the following description, the appended claims, and the accompanying drawing in which:

Figure 1:
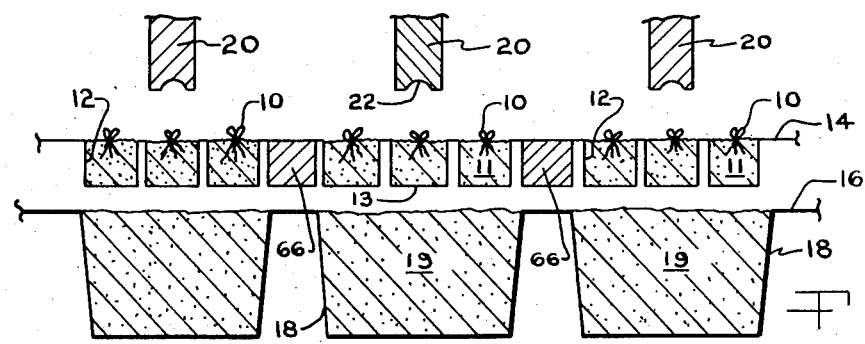
FIG. 1 is a diagrammatic view showing the seedling containing germinating tray, cell pack and plungers in position for transplant.
Figure 2:
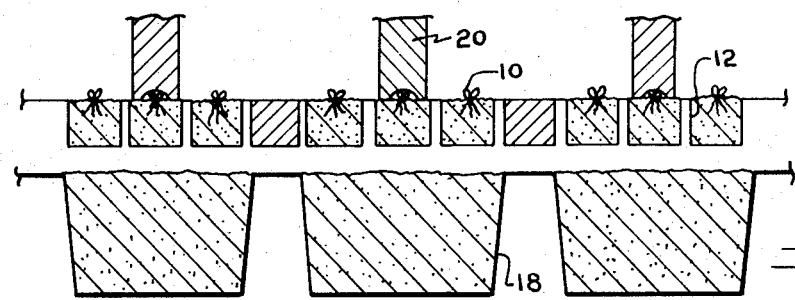
FIGS. 2, 3, 4 and 5 are views similar to FIG. 1 sequentially showing the plunger lowered into contact with the soil in the germinating tray, pushing the soil and seedling out through the tray's bottom, and into the cell pack container below, and then retracting.
Figure 3:
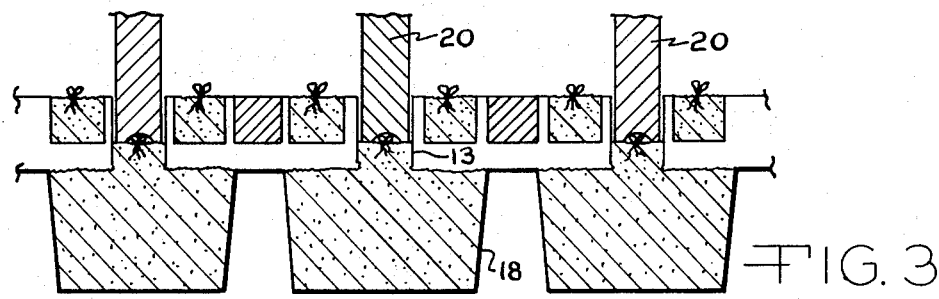
Figure 4:
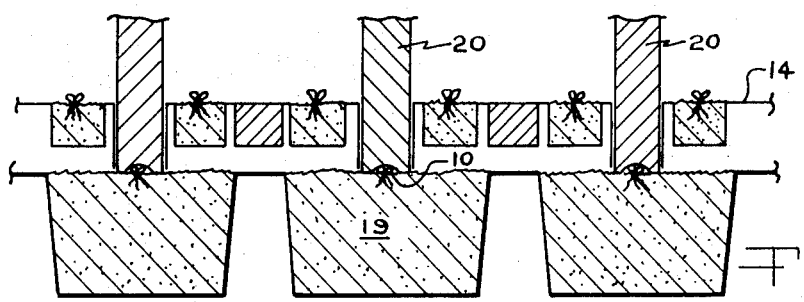
Figure 5:
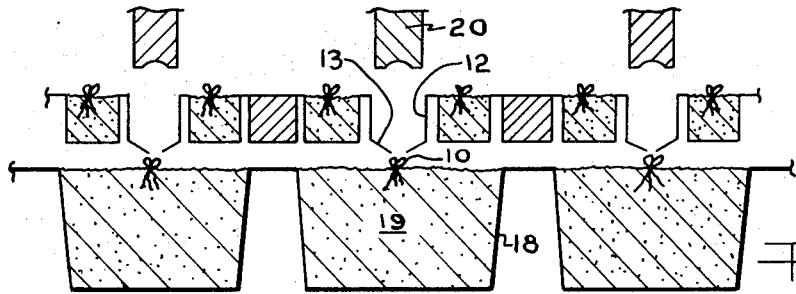

Referring to the drawings, the steps in the method of this invention for transplanting a seedling from a germinating tray are shown sequentially in FIGS. 1–5. Seedlings 10 are growing in soil 11 within compartments 12 of a germinating tray 14. The compartments 12 have bottom walls 13 and the soil 11 constitutes a soil bed arranged in discreet segments, each segment filling a compartment 12. The tray 14 is located above a flat or member 16 which has cells or containers 18 filled with soil 19 which likewise forms a soil bed. The containers 18 are much larger than the compartments 12 to allow seedlings planted therein to grow. A plunger 20 having a concave lower end or face 22 is positioned above the compartment 12 and lowered to contact the soil 11 in compartment 12. The seedling 10 is positioned within the concave end 22 and is thus protected from being crushed (FIG. 2). The plunger 20 is lowered to force the soil 11 and seedling 10 out through the bottom of the compartment 12 and into the soil 19 of the cell 18 (FIG. 3). As the plunger 20 is further lowered, the soil 11 and 19 commingle and soil portion 11 becomes indistinguishable. When the transplantation is completed (FIG. 4), the plunger 20 is withdrawn (FIG. 5).

Figure 9A:
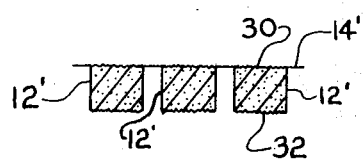
FIG. 9A is a fragmentary sectional view of a modified form of germinating tray of this invention.
Figure 8:
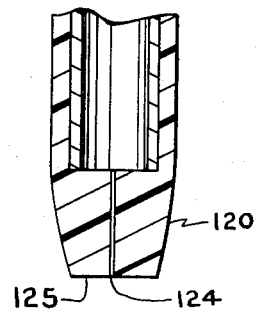
FIG. 8 is a cross sectional view of the vacuum nozzle of FIG. 7 shown in a position after depositing a seed in a germinating compartment in a preferred form of the germinating tray of this invention.
Figure 8:
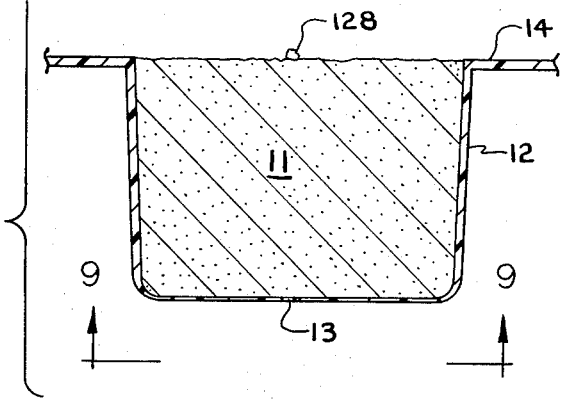
Figure 9:
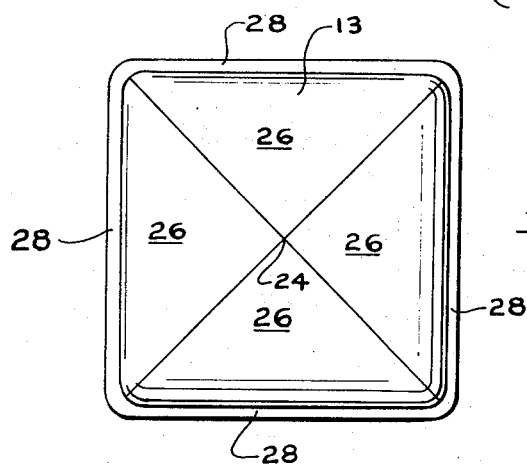
FIG. 9 is a bottom view of a germinating compartment as seen from the line 9—9 of FIG. 8.

In a preferred embodiment of the invention, the tray 14 is made of resilient plastic material with the compartments 12 pressed therein (FIG. 8). The bottom 13 (FIG. 9) is provided with an X-slit 24 which divides the bottom 13 into four triangular shaped portions 26. When the plunger 20 is lowered the triangular portions pivot or hinge at edges 28 and the bottom 13 opens along the X-slit 24.

In another embodiment of the invention, a tray 14' (FIG. 9A) is made of plastic material with compartments 12' pressed therein. These compartments 12' have openings 30 and 32 at the top and bottom respectively. Because the germinating soil 11 is of a fibrous nature, no bottom wall is required to hold the soil 11 within the compartment 12'.

Figure 10:
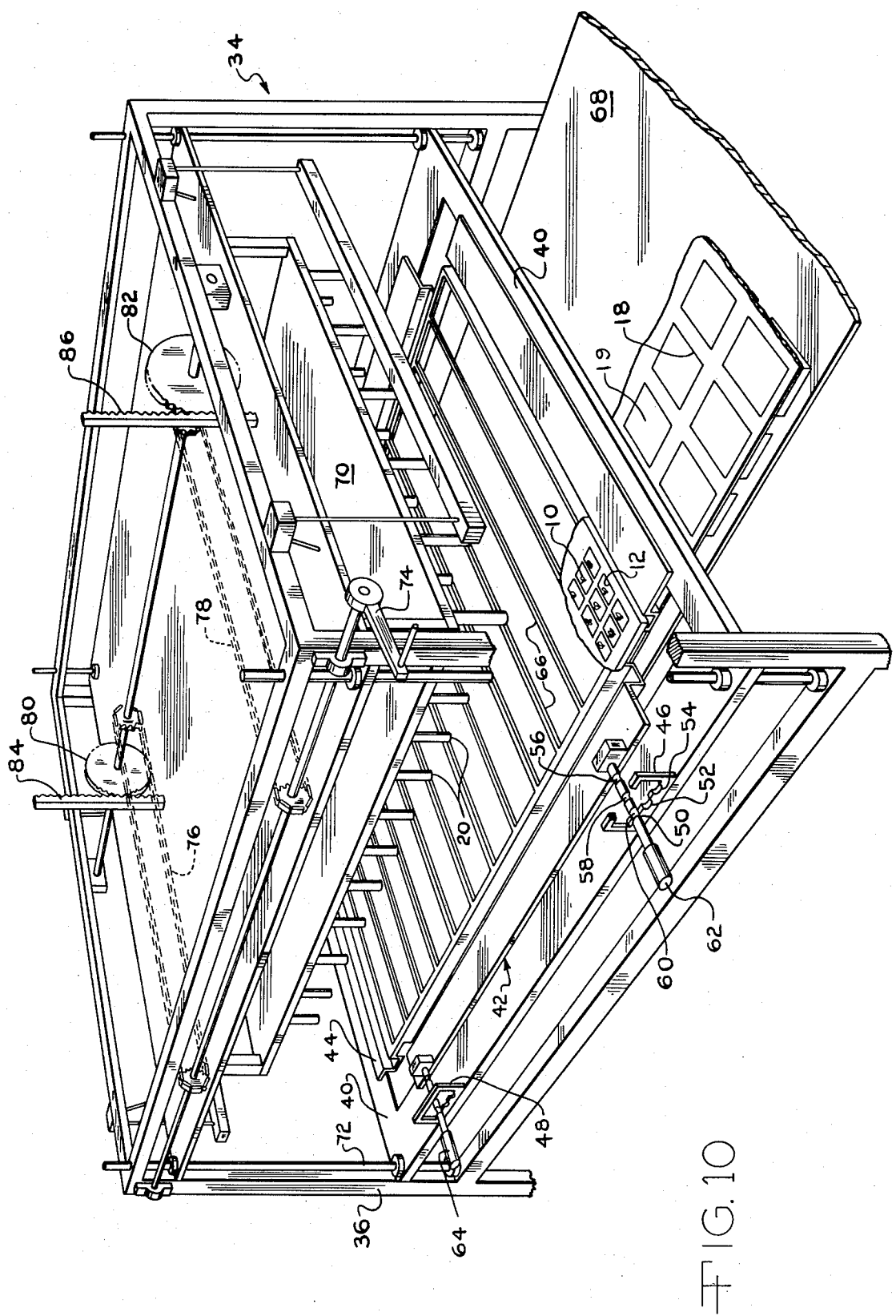
FIG. 10 is a perspective view of the transplanting apparatus.

A machine, indicated generally at 34 (FIG. 10), for accomplishing multiple transplants according to the method of this invention consists of a frame 36 havinga horizontal support plate 40. A horizontally movable open framework member or rack 42 has sliding members 44 which engage and slide upon the support plate 40 to provide planar movement of the member 42. The plate 40 has brackets 46 and 48 mounted thereon. The bracket 46 is exemplary and has three slots 50, 52 and 54 which engage annular slots 56, 58 and 60 in a rod 62 attached to the member 42. A similar rod 64 engages bracket 48. By indexing the engagement of the bracket slots 50, 52 and 54 and the annular slots 56, 58 and 60, the member 42 can be located in nine discreet horizontal positions.

The germinating tray 14 having 1,296 individual compartments 12 divided into groups of nine on a matrix, for example, is supported on the member 42 by positioning cross rods 66 in the member 42 in grooves in the tray 14 between the compartments 12. The cell pack 16 is positioned below and has individual growing cells 18 arranged on a conveyor 68. A plurality of plungers 20, numbering 72 in the illustrated machine 34, are mounted above the rack 42 on a plate 70 which slides up and down on rods 72. The plate 70 is raised and lowered by means of a crank 74 or other suitable means which, via sprocket and chain assemblies 76 and 78, turns pinion gears 80 and 82. The pinion gears 80 and 82 in turn engage gear tooth racks 84 and 86 attached to the plate 70.

In operation, the first tray of cells 18 are positioned below the rack 42 and each cell 18 is centered under a plunger 20. The rack 42 is indexed to the first of its nine horizontal positions by means of the brackets 46 and 48 and rods 62 and 64 so that a certain seedling containing compartment 12 in the germinating tray 14 is aligned under each plunger 20. The crank 74 is then operated to lower the plate 70 so that the plungers 20 are driven through the compartments 12 to accomplish the transplanting method shown in FIGS. 1–5. After the transplanting is accomplished as explained above, the conveyor 68 is moved to align a second group of cells 18 under the plungers 20. The rack 42 is indexed to its next position, and the transplant operation by means of the plunger 20 is repeated. After all 1,296 compartments 12 have been punched out, the empty tray 14 is replaced with one containing seedlings, and the operating continues.

Figure 6:
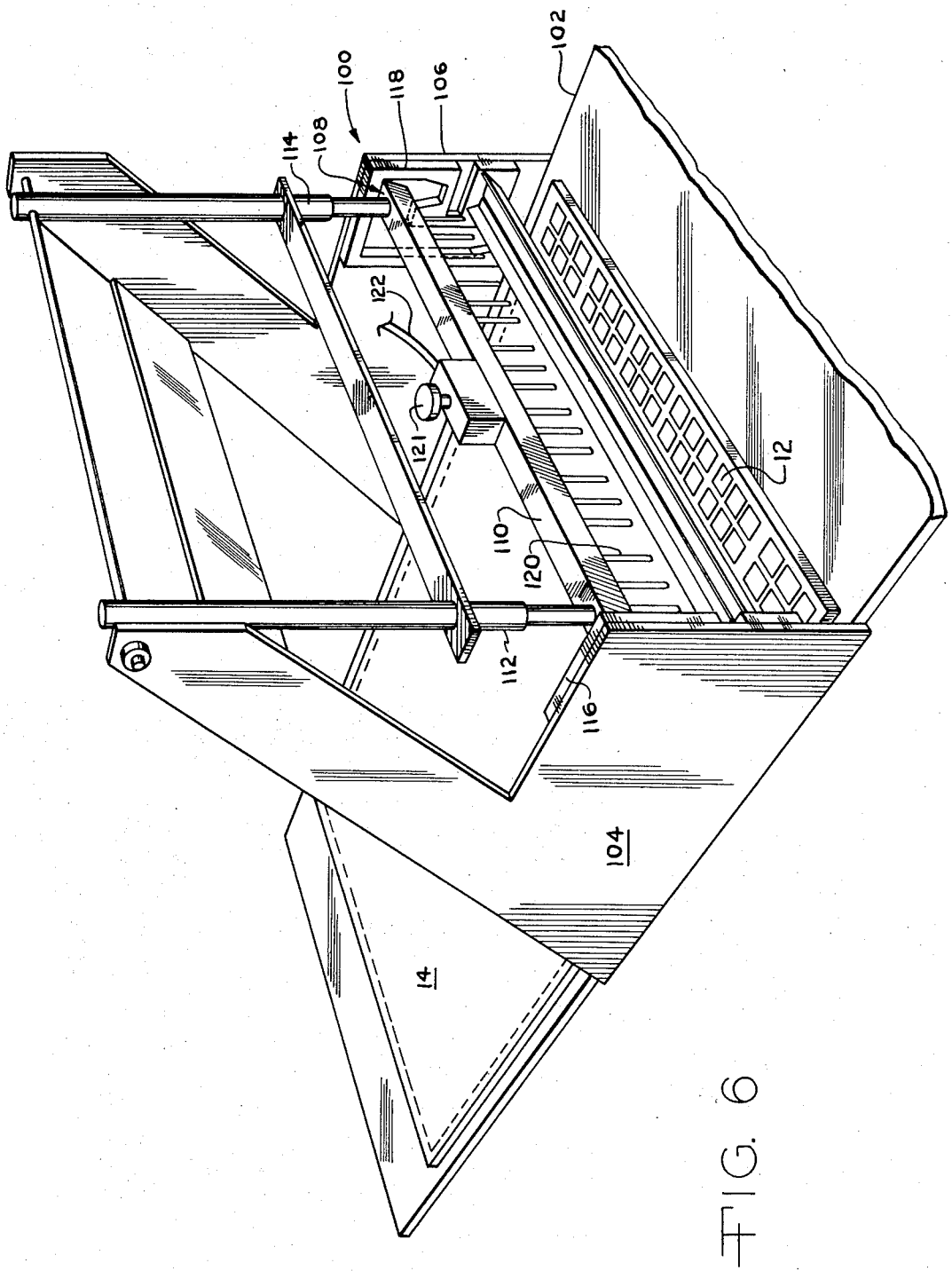
FIG. 6 is a perspective view of the seed planting apparatus used to plant individual seeds in the germinating compartments of the tray.

In preparing the germinating trays 14 for germinating and subsequent transplanting, it is advantageous to deposit only one seed in each compartment 12 so there will be no waste of seeds or multiple sprouting to interfere with the mechanical transplanting. A seed planting apparatus 100 according to this invention (FIG. 6) has a planar base 102 on which the germinating tray 14 rests and can slide. The planting apparatus 100 also has side members 104 and 106 which act as guides in which the tray 14 slides and which also support a seed pickup mechanism 108. The seed pickup mechanism 108 consists of a cross member 110 which is pivotally suspended by spring loaded telescoping assist arms 112 and 114. The cross member 110 is engaged in guides 116 and 118 at either end. The cross member 110 is hollow and has 12 hollow nozzles 120 extending downward therefrom and communicating with the hollow interior of the cross member 110. The cross member 110 is connected via a shut off valve 121 to a vacuum line 122 which leads to a vacuum source (not shown). Each nozzle 120 is formed of a relatively soft resilient material, such as plastic or rubber, and has a vacuum passage 123 therein which terminates at its inlet end 124 in a flat surface 125 at the lower end of the nozzle.

Figure 7:
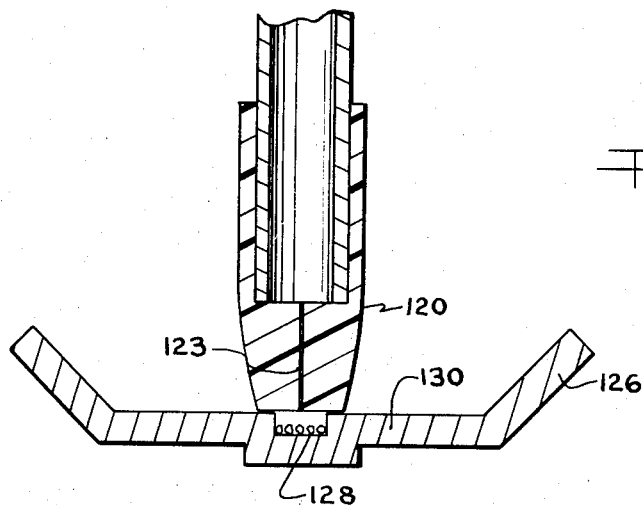
FIG. 7 is a cross sectional view of the vacuum nozzle and trough which is part of the seed planting apparatus.

A trough 126 containing a single layer of seeds 128 is mounted parallel to the cross member 110 so that the nozzles 120 can be lowered into the trough 126 and then manipulated by means of the guides 116 and 118 to a position above the compartments 12 of the tray 14. The nozzles 120 are lowered into the trough 126 to a position engaging the wall 130 and bridging the upper end of the compartment in which the seeds 128 lie. A single seed 128 is picked up by each nozzle 120 due to the vacuum and the flat surface 125 in which the opening 124 (FIG. 7) is located. The soft character of the nozzle 120 provides a surface to which the seed 129 can cling and enables the nozzle 120 to be positioned against the trough wall 130 without damage. Since the nozzles are spaced to correspond to the spacing of the compartments 12 of the tray, each nozzle can then be lowered to a position immediately adjacent the soil 11 in the compartment 12. The seed 128 is then deposited by releasing the vacuum by means of the shutoff valve 121 so that the seed rests on the soil 11 as shown in FIG. 8. The nozzles 120 are then raised, as shown in FIG. 8, and the above cycle is repeated.

Thus the planting apparatus 100 and the transplanting apparatus 34 together with the transplanting method described provide for the elimination of costly manual operations in growing greenhouse plants.

What is claimed is:

1. The method of transplanting plants from a germinating tray to a soil bed, said germinating tray having discrete soil segments contained therein and movable downwardly therethrough, said method comprising the steps of
    a. arranging said plants in said discrete soil segments,
    b. positioning said tray so that said bed is below and in a closely spaced relation therewith, and
    c. concurrently applying downwardly directed pushing forces to the top surfaces of certain of said segments of sufficient magnitude to move said segments downwardly from said tray, and continuing the application of said forces to said certain segments until said segments have been pushed into said bed so as to transfer the plants therein from said tray to said bed.

2. The method of claim 1 further including the step of:
    d. subsequently pushing others of said segments spaced horizontally from said certain segments downwardly.

* * * * *